(12) United States Patent
Bouldin

(10) Patent No.: US 7,503,759 B2
(45) Date of Patent: *Mar. 17, 2009

(54) CONTAINMENT SYSTEM FOR CONTINUOUS FLOW HYDROLIZERS

(75) Inventor: Floyd E. Bouldin, McMinnville, TN (US)

(73) Assignee: Bouldin Corporation, McMinnville, TN (US)

( * ) Notice: Subject to any disclaimer, the term of this patent is extended or adjusted under 35 U.S.C. 154(b) by 402 days.

This patent is subject to a terminal disclaimer.

(21) Appl. No.: 11/465,959

(22) Filed: Aug. 21, 2006

(65) Prior Publication Data

US 2007/0134358 A1    Jun. 14, 2007

Related U.S. Application Data

(63) Continuation of application No. 10/232,434, filed on Aug. 30, 2002, now Pat. No. 7,101,164.

(51) Int. Cl.
    B29C 43/34    (2006.01)
(52) U.S. Cl. .............. 425/167; 425/256; 425/350; 425/411; 100/218; 100/269.2; 100/276
(58) Field of Classification Search .......... 425/62, 425/167, 256, 350, 411; 100/215, 218, 269.2, 100/276, 269.01
    See application file for complete search history.

(56) References Cited

U.S. PATENT DOCUMENTS

| | | | | |
|---|---|---|---|---|
| 1,490,162 A | * | 4/1924 | Dow | ............... 425/156 |
| 2,780,987 A | * | 2/1957 | Wall | ............... 100/249 |
| 3,564,993 A | * | 2/1971 | Kunitoshi et al. | ...... 100/269.01 |
| 3,858,504 A | * | 1/1975 | Boyer | ............... 100/215 |
| 4,099,457 A | * | 7/1978 | Hyden | ............... 100/215 |
| 4,557,190 A | * | 12/1985 | Vezzani | ............... 100/215 |
| 4,569,649 A | * | 2/1986 | Gross | ............... 425/256 |
| 5,363,758 A | * | 11/1994 | Wildes et al. | ............... 100/215 |
| 6,017,475 A | | 1/2000 | Cantrell | ............... 264/140 |
| 6,397,492 B1 | | 6/2002 | Malley | |

* cited by examiner

*Primary Examiner*—Yogendra Gupta
*Assistant Examiner*—Thu Khanh T Nguyen
(74) *Attorney, Agent, or Firm*—Waddey & Patterson, P.C.; Phillip E. Walker

(57) ABSTRACT

A material handling system for a hydrolyzer, comprising a material injection assembly further comprising a ram, a cylinder having a cylinder shaft for reciprocating the ram upon actuation of the cylinder shaft, a sleeve having an interior in which the ram reciprocates during use; a gate having a gate plate operable from between an open and a closed position; the gate plate has an aperture formed therethrough and the aperture is sized to enable a plug of compressed municipal solid waste to pass through it when the gate plate is in the open position; and a material exit assembly. The preferred material handling system further comprises a gate plate is interpositioned between the pair of space apart end plates and reciprocates freely therebetween. The end plates are configured to allow a plug of municipal solid waste to pass therethrough. The material exit assembly further comprises a processed material handling apparatus including a processed material compaction chamber; and a plunger assembly attached to the compaction chamber and further including a working cylinder having a cylinder shaft and a ram operably connected to the shaft enabling the ram to compact the processed material within the compaction chamber upon actuation of the cylinder and the extension of the shaft therefrom.

32 Claims, 10 Drawing Sheets

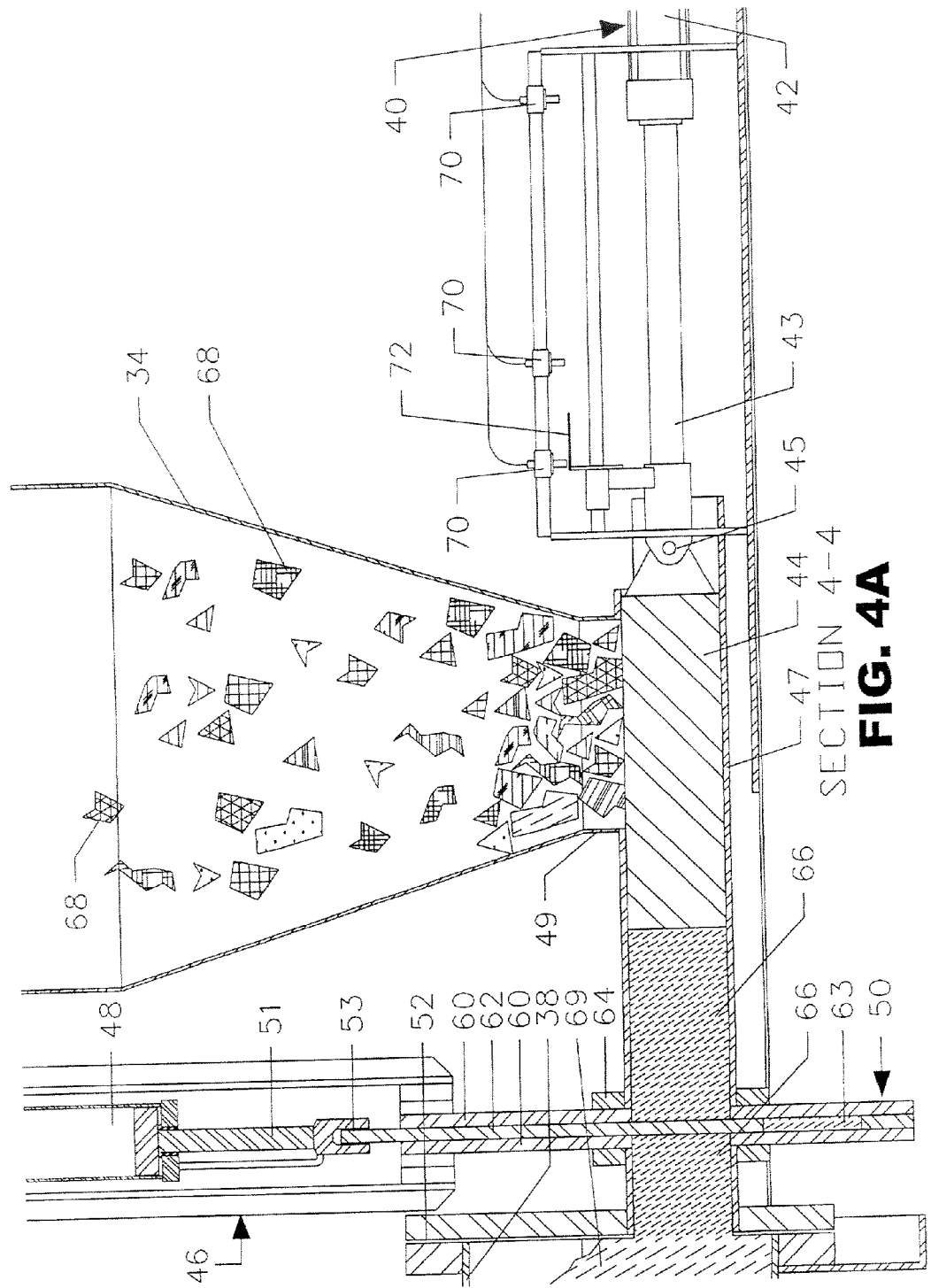
FIG. 4A SECTION 4-4

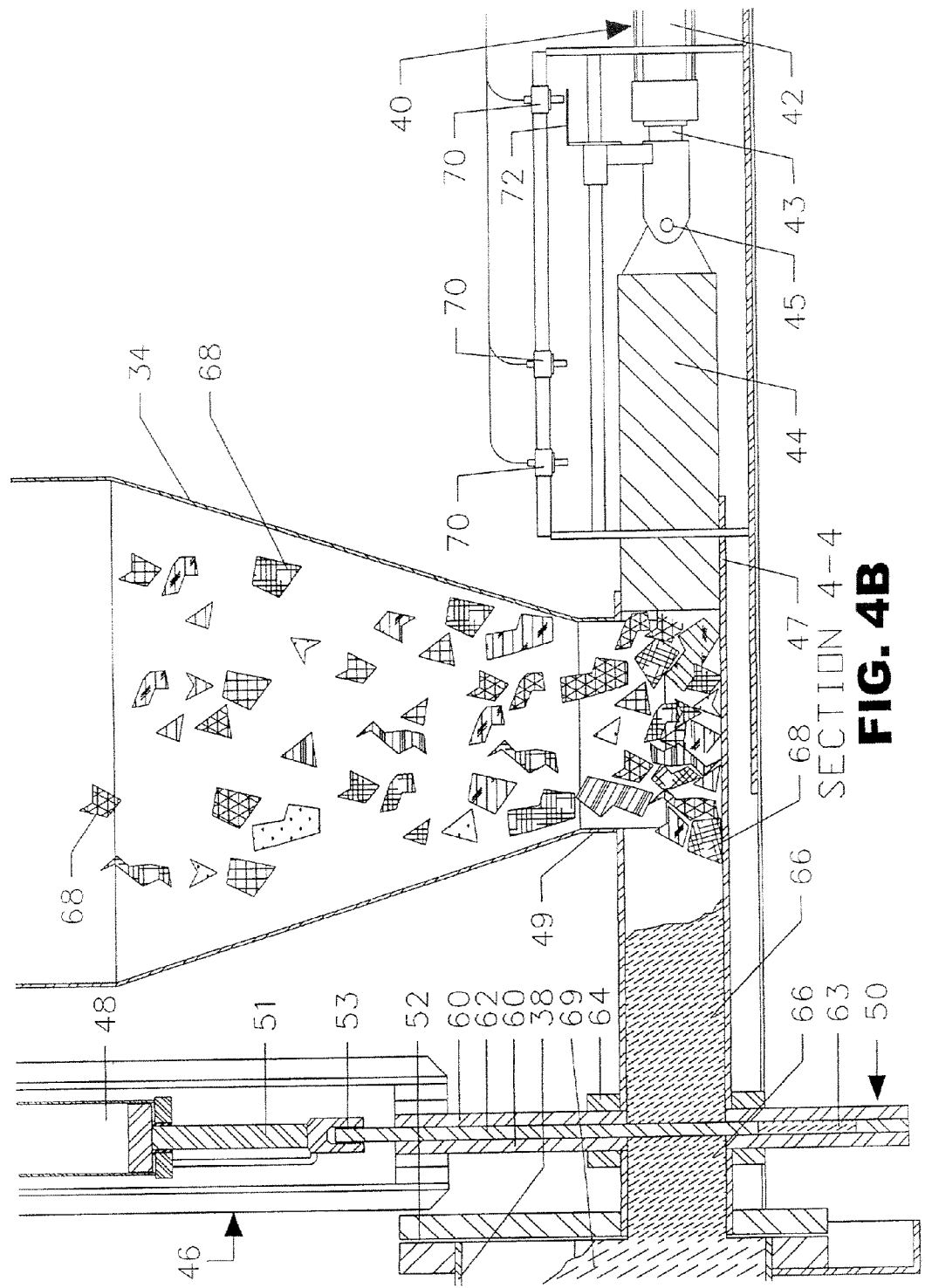
FIG. 4B SECTION 4-4

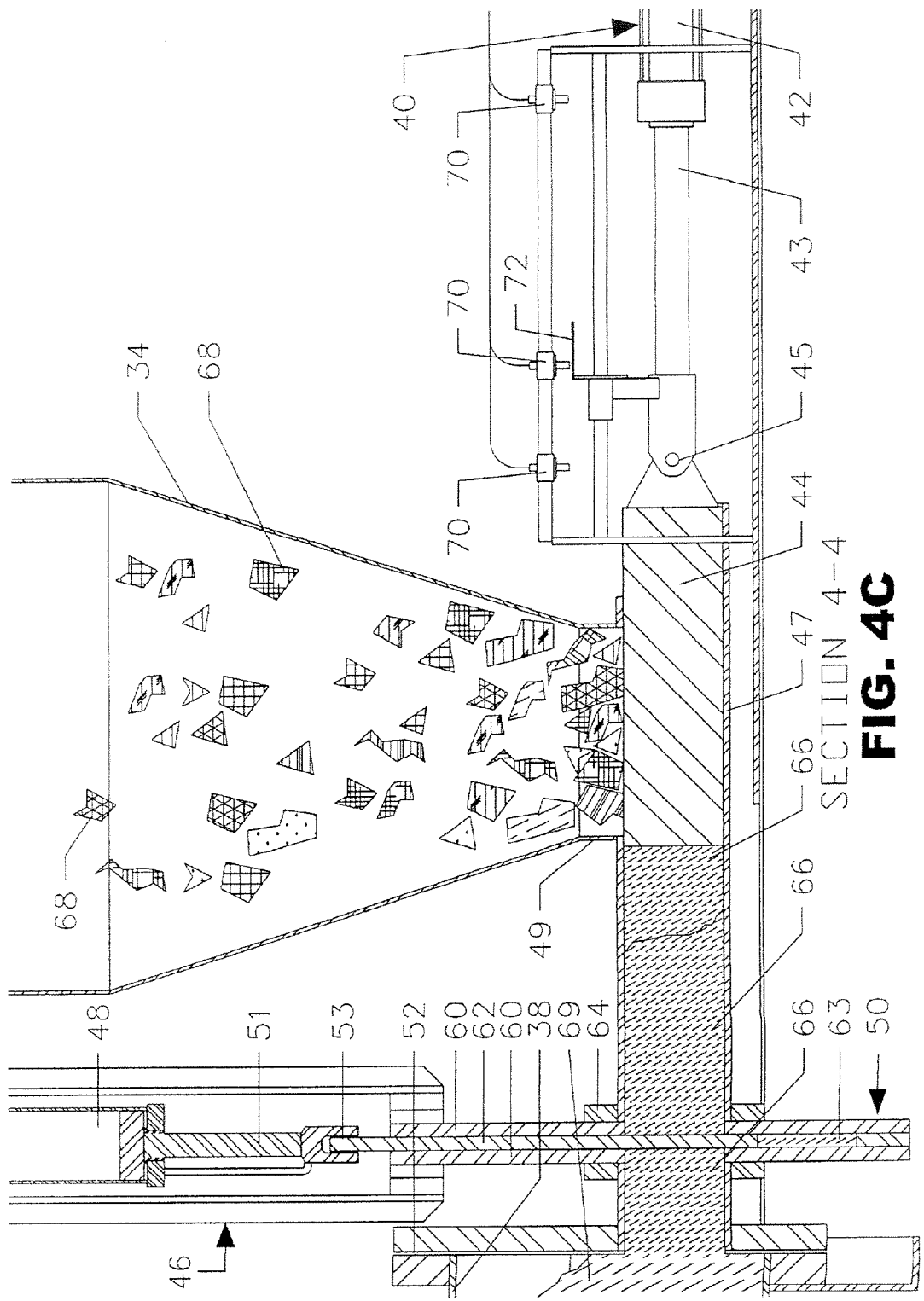
FIG. 4C SECTION 4-4

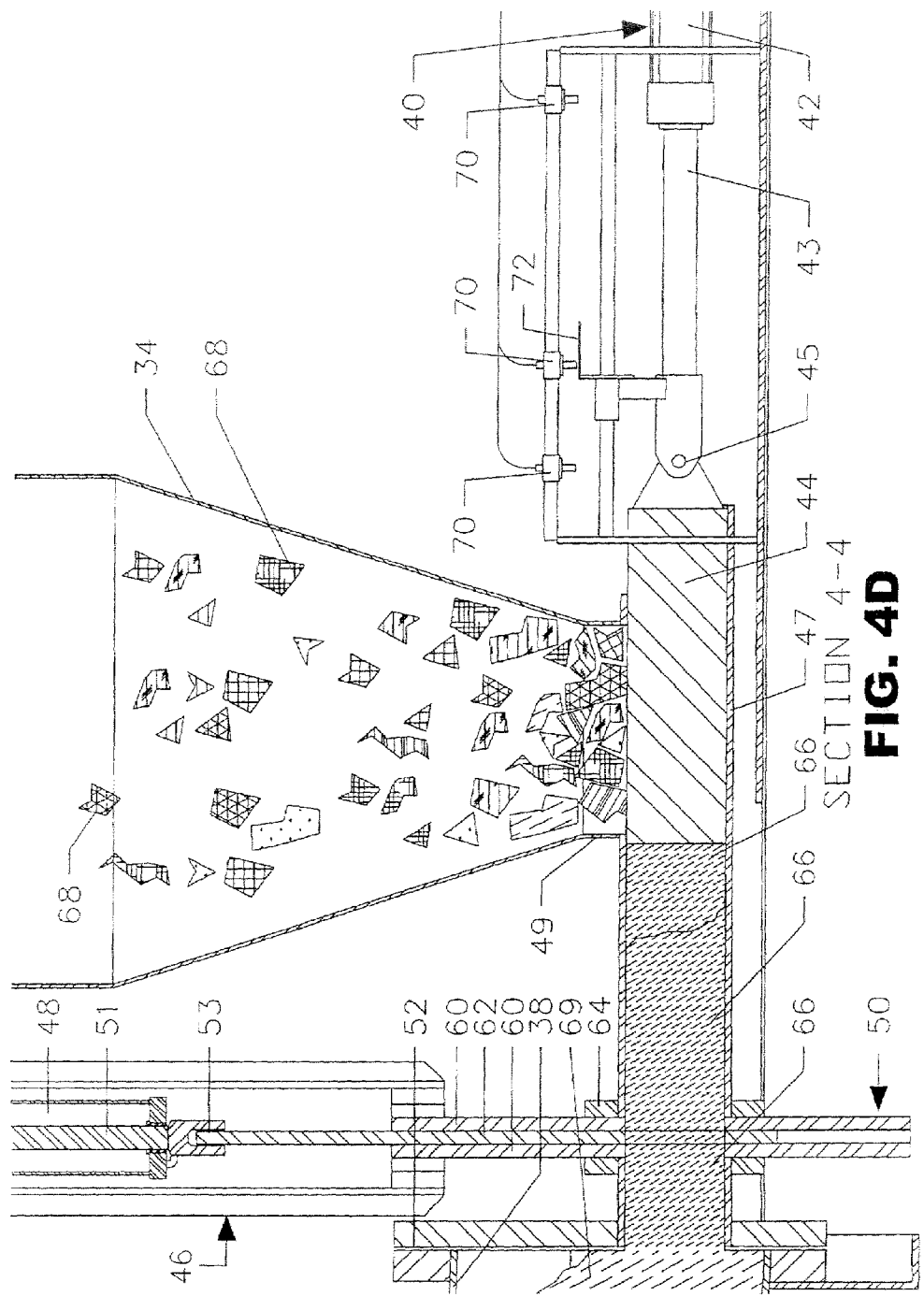

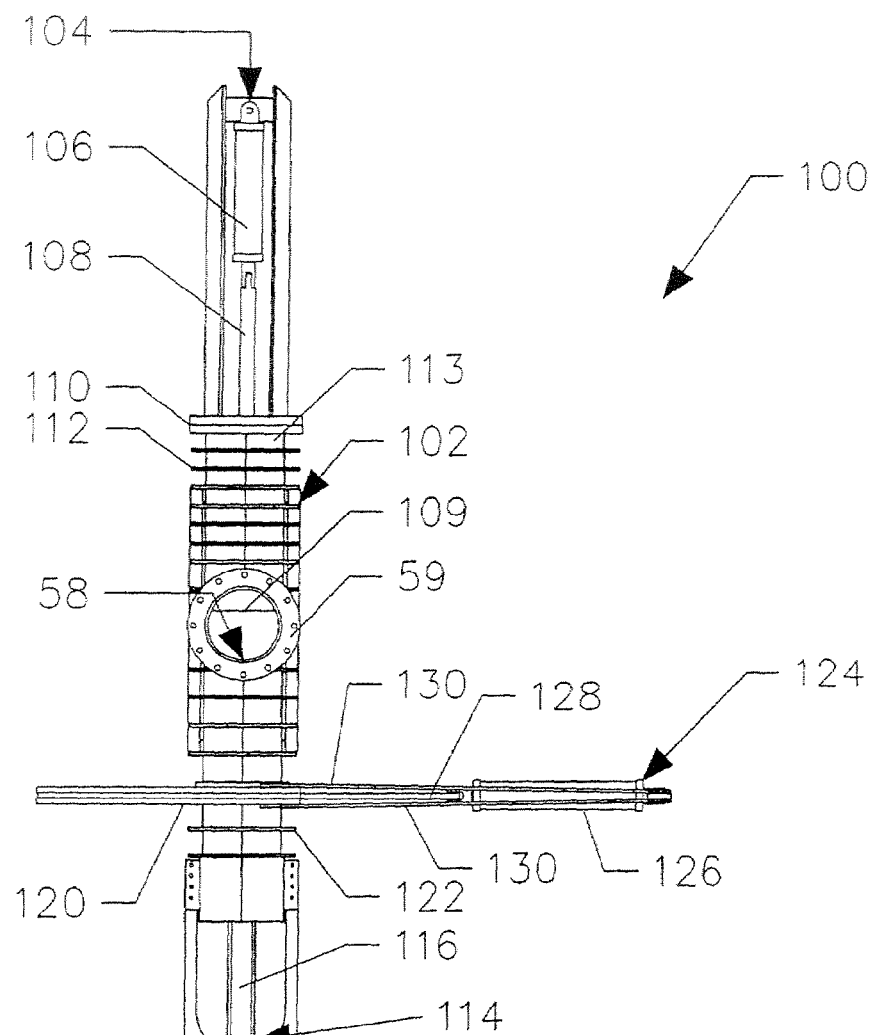
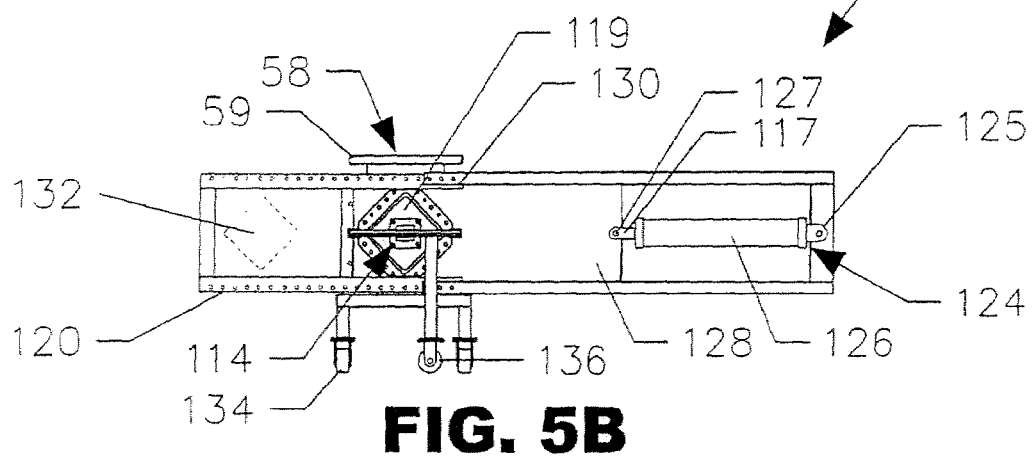

CONTAINMENT SYSTEM FOR CONTINUOUS FLOW HYDROLIZERS

CROSS-REFERENCES TO RELATED APPLICATIONS

This application is a Continuation application which claims benefit of U.S. patent application Ser. No. 10/232,434 filed Aug. 30, 2002, now U.S. Pat. No. 7,101,164 entitled "Containment System for Continuous Flow Hydrolizers", which is hereby incorporated by reference in it entirety.

FIELD OF THE INVENTION

The present invention relates generally to hydrolyzers for processing organic material (i.e., rendering) and further relates generally to the apparatuses used for the rendering of animal carcasses or parts thereof into useful end products such as bone or feather meal. In addition, the present invention has proven particularly useful for processing (i.e., rendering) municipal solid waste even though the material characteristics of municipal solid waste and the rendering of animal carcass parts is distinctly different.

The present invention is primarily directed to a pressure vessel apparatus in the general nature of a hydrolyzer used for the reduction, decomposition, destruction and/or conversion (hereinafter "rendering") of organic wastes generated during meat and poultry production for human consumption.

The present invention also relates generally to an innovative method of handling municipal solid waste disposal, reclamation and recycling. Municipal solid waste (hereinafter "solid waste") disposal can be generally defined as the disposal of normally solid or semi-solid materials resulting from human and animal activities that are useless or unwanted, and not hazardous or toxic.

Solid wastes may be further classified in two groups as follows: "municipal solid waste" which is decomposable wastes from food, and "rubbish" which is either combustible wastes (such as paper, wood, and cloth) or non-combustible wastes (such as metal, glass, plastics and ceramics).

The present invention is primarily directed to a system and apparatus for reducing and converting (hereinafter "processing") of solid waste comprised of municipal solid waste and rubbish produced in the home (hereinafter "Municipal Solid Waste" or "MSW") and the equipment for carrying out such processing into a reusable end product or article.

DESCRIPTION OF THE RELATED ART

Carcass disposal at meat and poultry farms is an important environmental issue. Some of the standard methods, such as burial and incineration, no longer meet the needs of operators or existing regulations. For example, prompted by recent water and air quality regulations, the poultry industry in some states and countries is giving carcass disposal top priority by supporting efforts to promote and adopt alternative disposal methods. One environmentally sound alternative for the disposal of dead birds is conventional rendering. Rendering is a reclamation process designed to recover almost 100 percent of all inedible raw poultry material and render it useful.

Rendering is a heating process that extracts usable ingredients, such as protein meals and fats. Rendering has been used for many years to convert the inedible results from the slaughtering process into meat meal, bone meal, and feather meal—all of which are highly valued as animal feed ingredients. Today, rendering plants supply 85 percent of all fats and oils used in the United States and export 35 percent of the fats and oils used worldwide. The rendering plant is a vital link between the meat and poultry grower and industries which use fats and oils.

The rendering industry relies on the hydrolyzer apparatus as the cooking vessel to perform the actual rendering process. However, these conventional hydrolyzer apparatuses which are commonly used as the cooking vessel in the rendering industry do not work when attempting to render various wastes such as municipal solid waste ("MSW"). These conventional vessels are prone to repeated and continuous clogging when trying to process waste material such as MSW and thus require repeated down time intervals and disassembly to empty the interior of the vessel.

Municipal solid waste disposal can be generally defined as the disposal of normally solid or semi-solid materials resulting from human and animal activities that are useless and unwanted and not hazardous or toxic. Solid wastes may be further classified in the following manner: "garbage" which is decomposable wastes from food; "rubbish" which is decomposable wastes, either combustible (such as paper, wood, and cloth) or non-combustible (such as metal, glass, plastics and ceramics).

It has become known that the traditional rendering devices such as hydrolyzers do not work with all materials and fail miserably when trying to process MSW. Similarly, the know how associated with conventional rendering processes is not applicable to a processing of certain wastes such as MSW in a similar manner. Until now, a suitable hydrolyzer for sustained continuous flow and rendering of raw wastes such as MSW has not been invented.

In all known methods of solid waste disposal (e.g., reduction, treatment or resource recovery), the resultant end product may further include microbes or microorganisms that require careful consideration and handling prior to disposal. In such cases the by-products are believed to remain waste materials not suitable for use or transformation into useful articles.

The art to which the invention relates generally includes U.S. Pat. No. 6,017,475 granted to Cantrell and incorporated by reference as if fully set forth herein. The '475 patent is directed to a process transforming municipal solid waste into useful materials.

SUMMARY OF THE INVENTION

Preprocessed municipal solid waste is then transferred, either automatically or manually, into a hydrolyzer by the components of the present invention. The hydrolyzer metamorphically processes the preprocessed volume of MSW into a useful end product. The preferred bio-reactor is similar in appearance to a conventional hydrolyzer, but the two are distinctly different devices. The preferred hydrolyzer apparatus is also available from Bouldin & Lawson, Inc. and is a novel and nonobvious design.

In sum, the hydrolyzer includes an outer containment vessel having an exterior jacket and an interior pressure vessel. An airspace exists between the interior vessel and the jacket. A heated steam inlet and exit are attached to the jacket and communicate with the air space. The preprocessed material is introduced into the interior pressure vessel of the hydrolyzer automatically by an inventive gate system and either before or after its introduction therein, the operator introduces heated steam into the air space surrounding the interior vessel to heat the interior vessel and the preprocessed municipal solid waste inside it.

A preferred temperature of the steam is 350 degrees Fahrenheit which, depending upon the preselected interior volume of the hydrolyzer, has an associated internal operating pressure. The present invention automatically transfers the preprocessed material such as municipal solid waste from system component to system component in a continuous fashion.

Of course, the process of the present invention could be carried out at other temperature and pressure ranges, but the associated time for completion of the inventive process at these other temperature and pressures will vary significantly. That is, the greater the temperature and pressure in the hydrolyzer, the faster the chemical reactions occur. However, a practical upper and lower limit to pressure and temperature exists.

The pressure and temperature, in conjunction with the composition of the MSW, acts as the catalyst to speed the chemical reaction of decomposition of the MSW within the vessel. This high temperature and pressure environment causes the MSW to rapidly decompose into its basic constituent elements, and allows them to recombine or remain in their organic cellulose form, and it kills bacteria once living within the MSW.

When the processing is complete, the processed aggregate cellulose is removed from the hydrolyzer. The aggregate end product is a mixture of cellulose fibers and other elements present in the MSW prior to processing. The aggregate cellulose may be dried, compressed or extruded or otherwise used manufacture useful articles. For example, the aggregate cellulose can also be used to manufacture plasticene cross ties, and building materials such as bricks, blocks, and the like.

The present invention may be summarized in a variety of ways one of which is the following: a material handling system for a hydrolyzer or hydrolyzer, comprising a material injection assembly further comprising a ram, a cylinder having a cylinder shaft for reciprocating the ram upon actuation of the cylinder shaft, a sleeve having an interior in which the ram reciprocates during use; a gate having a gate plate operable from between an open and a closed position; the gate plate has an aperture formed therethrough and the aperture is sized to enable a plug of compressed municipal solid waste to pass through it when the gate plate is in the open position; and a material exit assembly.

The preferred embodiment further includes switch means for opening and closing the gate plate depending upon the reciprocal position of the ram. A plurality of proximity switches for determining the discrete position of the ram are also provided. An embodiment of the material handling further comprises a hopper supported by the sleeve and having an open bottom which communicates with an opening in the sleeve, a ram having an exterior shape similar to the interior of the sleeve in order to block the opening in the sleeve when municipal solid waste is compressed within the sleeve. A tenon mounted to the cylinder and positioned to touch the contact switches during reciprocation of the ram to actuate the switches and the opening or closing of the gate plate is also provided. A platform for supporting the material injection assembly in axial alignment with the horizontal axis of the hydrolyzer is also provided.

The gate further comprises a pair of space apart end plates and the gate plate is interpositioned between the pair of space apart end plates and reciprocates freely therebetween. The end plates are configured to allow a plug of municipal solid waste to pass therethrough.

The preferred processed material handling apparatus, or FLUFF handling apparatus, further comprises a processed material compaction chamber; and a plunger assembly attached to the compaction chamber and further including a working cylinder having a cylinder shaft and a ram operably connected to the shaft enabling the ram to compact processed material within the compaction chamber upon actuation of the cylinder and the extension of the shaft therefrom.

The present invention may also be summarized as follows: a material handling system for a hydrolyzer or hydrolyzer, comprising a material injection assembly, a material exit assembly further comprising a gate having a gate plate operable from between an open and a closed position, wherein the gate plate has an aperture formed therethrough and the aperture is sized to enable processed material within the hydrolyzer or hydrolyzer to pass through it when the gate plate is in the open position and exit the vessel.

Yet another way of summarizing the present invention is as follows: a material injection assembly and a material exit assembly and each further comprising a gate having a gate plate operable from between an open and a closed position and the gate plate has an aperture formed therethrough and the aperture is sized to enable a plug of compressed municipal solid waste to pass through it when the gate plate is in the open position.

BRIEF DESCRIPTION OF THE DRAWINGS

FIG. 4A is a partial cross-sectional view of the inlet infeed portion shown in FIG. 2 with the ram and gate members shown in a first position;

FIG. 4B is a partial cross-sectional view of the inlet infeed portion shown in FIG. 2 with the ram member shown in a second position and the gate member shown in the first position;

FIG. 4C is a partial cross-sectional view of the inlet infeed portion shown in FIG. 2 with the ram member shown in a third position and the gate member shown in the first position;

FIG. 4D is a partial cross-sectional view of the inlet infeed portion shown in FIG. 2 with the ram member shown in the third position and the gate member shown in the second position;

FIGS. 5A and 5C are top views of the optional material exit processed material handling portion of the present invention; and FIGS. 5B and 5D are end views of the optional material exit processed material handling portion shown with the optional material shuttle mechanism shown in a first position.

DETAILED DESCRIPTION OF THE PREFERRED EMBODIMENT(S)

Figure 1:
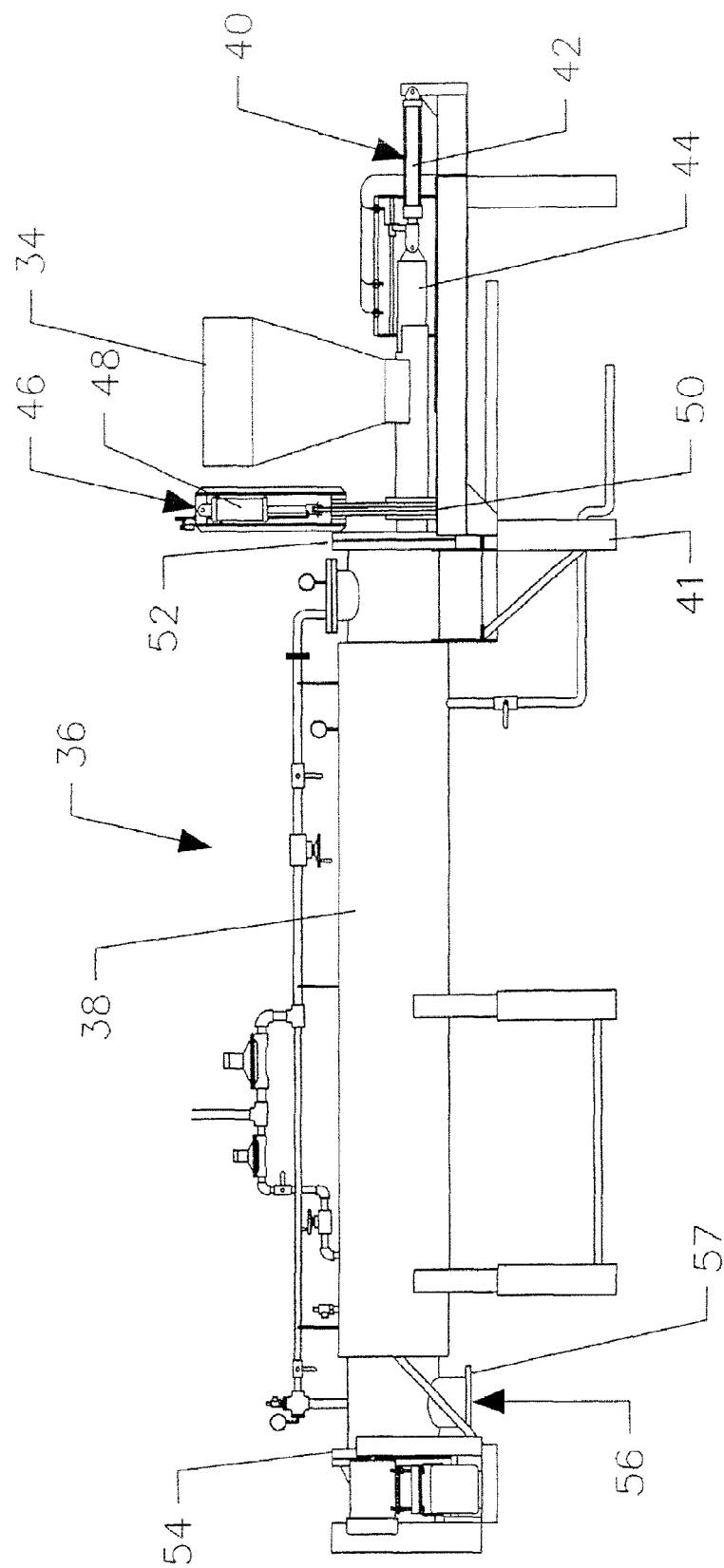
FIG. 1 is a side view of a hydrolyzer.

With reference to FIG. 1, a hydrolyzer is designated generally by the reference numeral 36. Hydrolyzer 36 includes a cylindrical pressure vessel 38, and a material injection assembly designated generally by the reference numeral 40. Platform 41 elevates and supports the various components above the ground.

Figure 2:
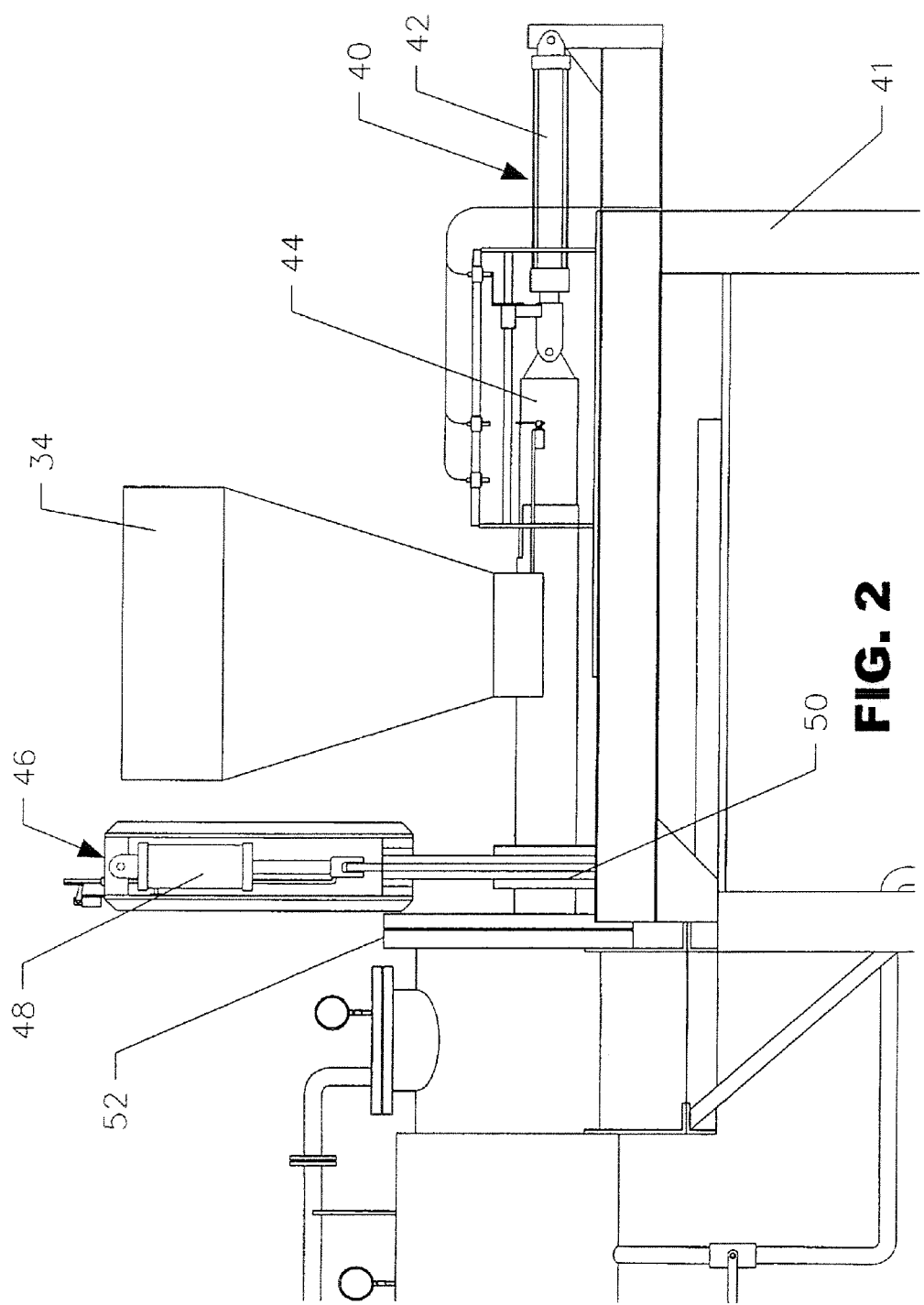
FIG. 2 is a side view of the inlet infeed section of the hydrolyzer shown in FIG. 1.
Figure 3:
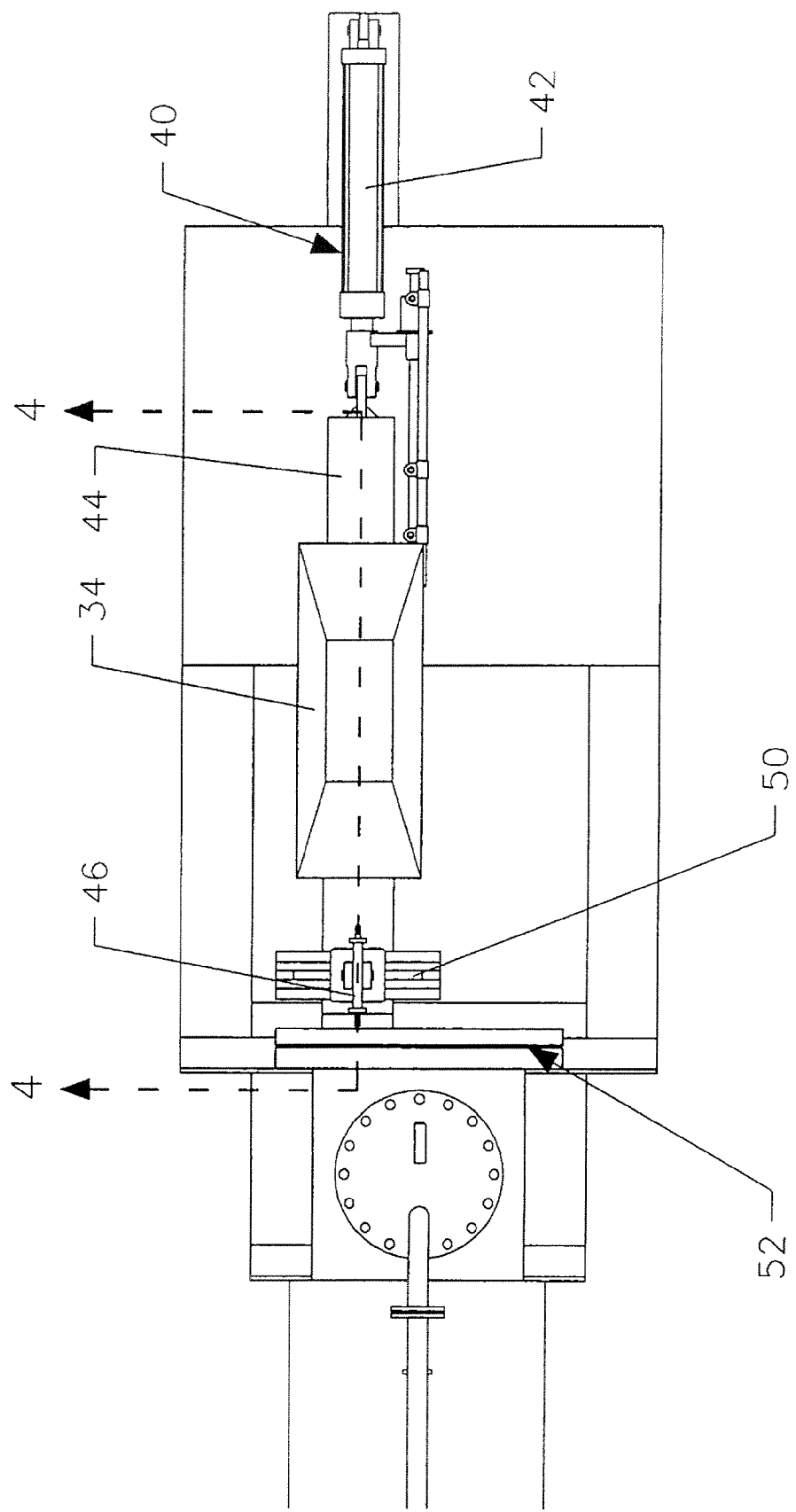
FIG. 3 is a top view of the inlet infeed section shown in FIG. 2.

With reference to FIGS. 1-3, the material injection assembly 40 further includes a pneumatic or hydraulic cylinder 42 operably connected to a ram 44. An infeed regulator gate assembly is also provided and is designated generally by the reference numeral 46. The gate assembly 46 includes a vertically (as shown but also be at any angle) oriented pneumatic or hydraulic cylinder 48 operably connected to a sliding gate assembly 50 which opens and closes an internal passageway into the hydrolyzer 38 at an inlet end 52 which is opposite the exit end 54 having exit port 56.

FIGS. 4A-4E are provided to illustrate the operation of the material injection assembly 40 during use. Cylinder 42 further includes a cylinder shaft 43 operably coupled to the ram 44 by a pin engagement 45 such that the stroke of the shaft 43 is immediately transferred to the ram 44 which moves inside the pipe sleeve 47 having a first open end 49 in communication with the hopper 34 and a second open end coinciding with the hydrolyzer inlet 52.

The sliding gate assembly 50 further comprises opposing end plates 60 and a reciprocating gate plate 62 interpositioned therebetween. The gate plate 62 is operably connected to the cylinder 48 at the shaft coupling 53 of the shaft 51 and slides vertically between the end plates 60 which are secured to the pipe sleeve 47 via attachment collars 64. Municipal solid waste plug 66 is formed within the pipe sleeve 47 by the introduction of the loose, preprocessed, municipal solid waste 68 entering the hopper 34 and feeding into the sleeve at opening 49. The plug 66 is moved into the hydrolyzer at inlet end 52 and rapidly disassociates into a less dense mass of material 69 for processing.

In use, the proximity contact switches 70 transmit open and close signals to a control station (not shown) when the tenon 42 touches a portion of the switch 70 as the shaft 43 moves reciprocally. The material injection assembly 40, the proximity switches 70, and the preferred processed material handling assembly 100 (FIGS. 5A-5D) are more thoroughly described in the Mode of Operation set forth below.

With reference to FIGS. 5A-5D, the municipal solid waste 69 processed within the hydrolyzer 38 exits the vessel at port 56 and enters the processed material handling apparatus 100 at its inlet 58. Inlet 58 further includes a vessel coupling collar 59 configured for secure attachment to a cooperating collar associated with the hydrolyzer 38 (see FIG. 1).

The preferred embodiment of the processed material handling apparatus 100 includes a compaction chamber 102 which receives the processed municipal solid waste or FLUFF material (FLUFF is a trademark of Bouldin Corporation, McMinnville, Tenn.) exiting the hydrolyzer 38 and compresses it via the plunger assembly 104. Plunger assembly 104 further includes a pneumatic or hydraulic cylinder 106 having a shaft 108 attached to a ram 109. The plunger assembly 104 is securely attached to the compaction chamber 102 by a mating cooperating collar 110. Fins 112 provide structural support for the compaction tube 113 to resist bending and maintain the alignment with the ram 109 which reciprocates therein.

The force of the ram 109 on the FLUFF material is sufficient to produce a compressed block of FLUFF material (not shown). Block cutter assembly 124 includes a pneumatic or hydraulic cylinder 126 attached at one end to a frame 120 at cross-member 125. Cylinder shaft 127 is operably attached to the knife 128 which slides between opposing halves of the 120. Knife 128 further includes an aperture 132 which is configured to be aligned with the compaction tube 113.

Containment assembly 114 consists of a truss 115 to which a containment cylinder 116 is attached. Cylinder shaft 117 terminates in a stop plate 119 which serves as the backstop of the ram 109 enabling the FLUFF interpositioned between the ram 109 and stop plate 119 to form a compressed block having the exterior dimension resembling the interior configuration of the compaction tube 113 during use.

Wheeled carriage assemblies 134 and 136 enable the FLUFF handling apparatus to be supported and mobile as the knife 128 cuts the compacted FLUFF into individual blocks after the compaction tube 113 if full of compressed material as determined by the bottom of the stroke of the cylinder shaft 117 which is overpowered by the stroke of the cylinder shaft 108 during the compaction of the block.

Mode of Operation.

Figure 4E:
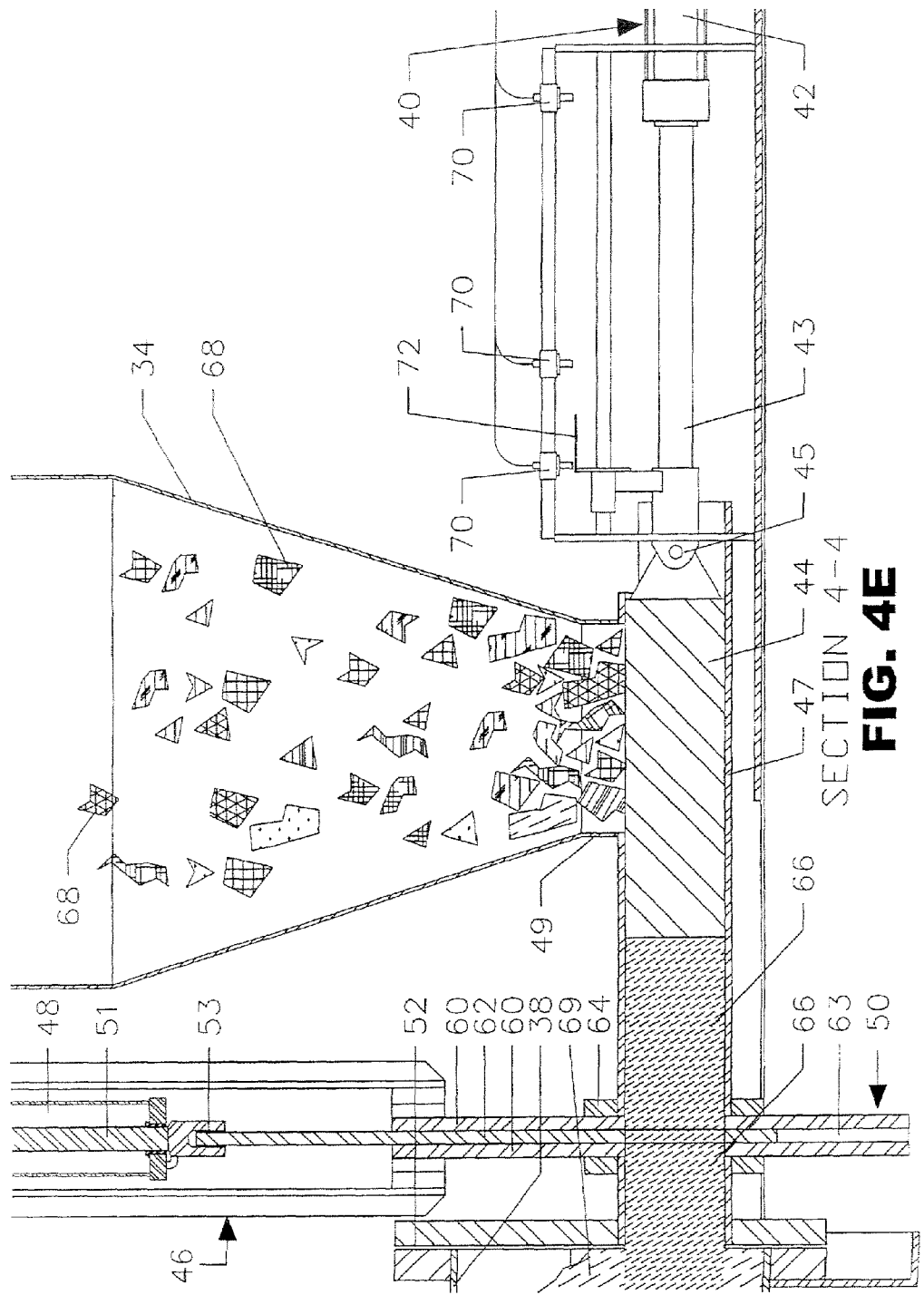
FIG. 4E is a partial cross-sectional view of the inlet infeed portion shown in FIG. 2 with the ram member shown in a first position and the gate member shown in the second position.

With reference to FIGS. 4A and 4E, the ram 44 is in its fully extended hydrolyzer loading position. The plug 66 is being introduced into the hydrolyzer 38 (FIG. 4E) with the gate plate 62 in its raised position in order to align its aperture 63 with the interior of the pipe sleeve 47. The plug 66 then rapidly dissociates into a less dense mass as designated by the numeral 69 and the gate plate 62 closes by being driven vertically downward in the drawing.

With reference to FIGS. 4A and 4B the ram 44 is then withdrawn from its fully extended first position (4A) to its fully extracted second position (4B). In this position, preprocessed municipal solid waste 68 is allowed to freely fall from the hopper 34 into the pipe sleeve 47 prior to forming a complete plug 66 (compare FIGS. 4B and 4C with respect to the plug 66). It is important to note, further extraction of the ram 44 is prevented by the proximity switch 70 being actuated by the tenon 72 traveling with the cylinder shaft 43. In like manner the proximity switches 70 are actuated at each of the three ram positions in order to coordinate the movement of the gate plate 62 in relation thereto.

With reference to FIGS. 4B and 4C, the ram 44 is pushed to its third position closing off the inlet 49 from the hopper 34 and forming the competed plug 66 as indicated by the plug seam 67 of FIG. 4C. The gate plate 62 is still in its closed position allowing the plug to be uniformly compressed and eliminate the seam 67. With reference to FIGS. 4C and 4D, the gate plate 62 is raised by actuation of the cylinder shaft 51 enabling the pipe sleeve 47 to communicate with the interior of the hydrolyzer 38 prior to the forceful insertion of the plug 66 therein.

With reference to FIGS. 4D and 4E, the plug is driven into the interior for the hydrolyzer by the ram 44 until the ram 44 reaches its fully extended position as determined by the contact between the proximity switch 70 and tenon 72. At this time the gate plate 62 closes (FIG. 4E).

Figure 5C:
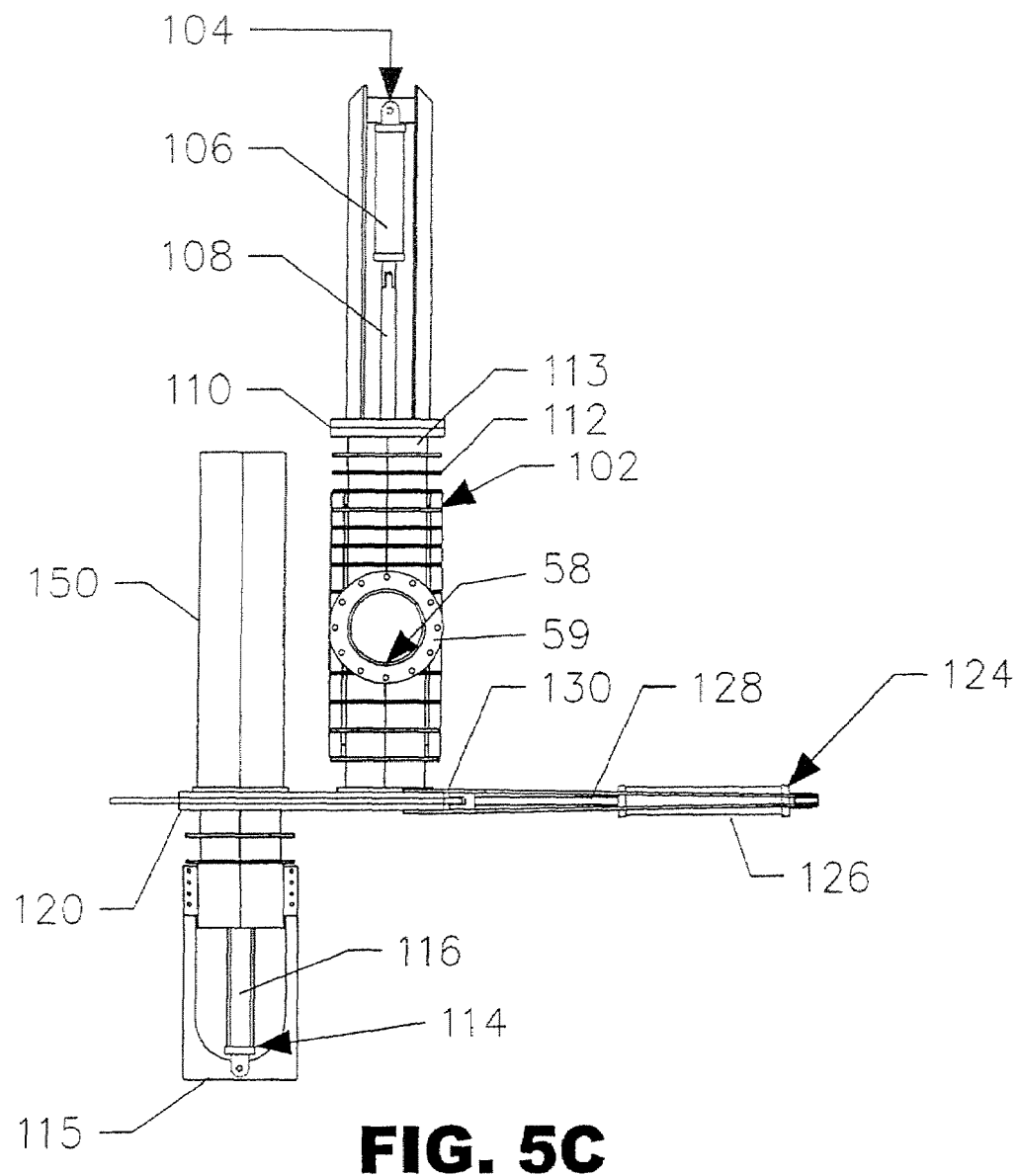

With reference to FIGS. 5A-5D, after a sufficient amount of FLUFF is released from the hydrolyzer 38 and input into the FLUFF handling apparatus 100, the ram 109 compresses the FLUFF into a block as described above. The compression and compaction of FLUFF continues until such time as the force of the block onto the stop plate 119 overcomes the force of the cylinder 116 driving it to its fully compressed position (FIGS. 5A and 5B).

Figure 5D:
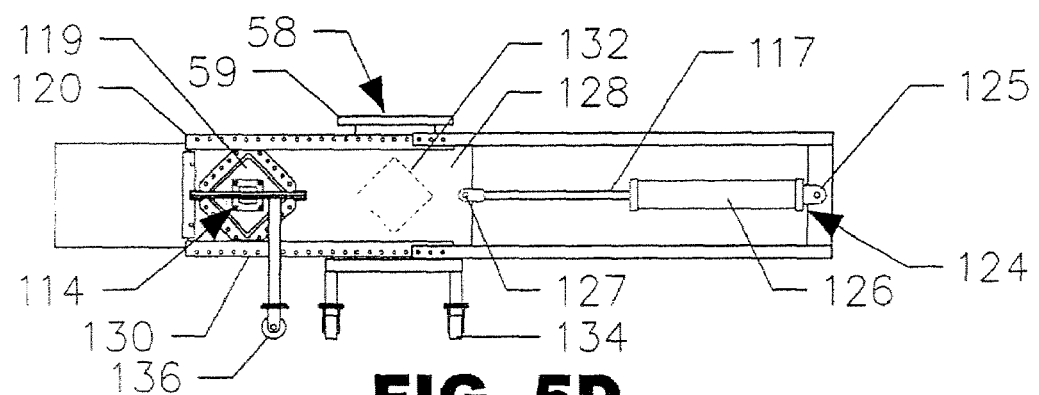

With reference to FIGS. 5C and 5D, the cylinder 126 forces the knife 128 to cut the compacted block into a discrete size depending upon the volume of the compaction tube 113 which travels with the knife as shown in FIG. 5C. In this position, the block may be expelled into an optional expansion chamber 150 where it may be allowed to cool or be dispersed.

What is claimed is:

1. A material handling system for a hydrolyzer, comprising:
    a material injection assembly further comprising:
        a first ram having exterior shape;
        a sleeve having an interior in which the first ram reciprocates during use, the interior having an interior shape;
        a gate having a gate plate operable from between an open and a closed position wherein material may exit the sleeve when the gate plate is in the open position; and the exterior shape of the first ram is similar to the interior of the sleeve in order to block the opening in the sleeve when municipal solid waste is compressed within the sleeve;

the hydrolyzer receiving the material from the sleeve; and a material exit assembly receiving material from the hydrolyzer comprising:
 a second ram; and
 a compaction chamber in which the second ram reciprocates during use.

2. The material handling system of claim 1, further comprising: switch means for opening and closing the gate plate depending upon the reciprocal position of one or more of the rams.

3. The material handling system of claim 2, wherein the switch means includes a plurality of proximity switches for determining the discrete position of one or both of rams.

4. The material handling system of claim 2, further comprising: one or more tenons attached to one or both of the rams and positioned to touch the switches during reciprocation of the rams to actuate the switches and the opening or closing of the gate plate.

5. The material handling system of claim 1, further comprising: a hopper supported by the sleeve and having an open bottom which communicates with an opening in the sleeve.

6. The material handling system of claim 1, further comprising: a platform for supporting the material injection assembly in axial alignment with the horizontal axis of a hydrolyzer.

7. The material handling system of claim 1, wherein the gate further comprises: a pair of end plates.

8. The material handling system of claim 7, wherein: the gate plate is interpositioned between the pair of end plates and reciprocates freely therebetween.

9. The material handling system of claim 8, wherein the end plates are configured to allow material to pass therethrough when the gate plate is in the open position.

10. A material handling system for a hydrolyzer, comprising:
 a material injection assembly further comprising:
  a first ram;
  a sleeve having an interior in which the first ram reciprocates during use; and
  a gate having a gate plate operable from between an open and a closed position wherein material may exit the sleeve when the gate plate is in the open position;
 the hydrolyzer receiving the material from the sleeve; and
 a material exit assembly receiving material from the hydrolyzer comprising:
  a second ram;
  a compaction chamber in which the second ram reciprocates during use; and
  a processed material handling apparatus.

11. The material handling apparatus of claim 10, wherein the processed material handling apparatus further comprises: a processed material compaction chamber; and a plunger assembly attached to the compaction chamber and further including a working cylinder having a cylinder shaft and a ram operably connected to the shaft enabling the ram to compact processed material within the compaction chamber upon actuation of the cylinder and the extension of the shaft therefrom.

12. A material handling system for a hydrolyzer, comprising:
 a material injection assembly for sending material into the hydrolyzer comprising a sleeve having an interior for receiving pre-processed material, the interior having an interior shape; and
 a ram that reciprocates within the sleeve during use,
a material exit assembly receiving material from the hydrolyzer comprising
 a compaction chamber for receiving processed material;
 a second ram for compacting processed material within the compaction chamber;
 a gate having a gate plate operable from between an open and a closed position;
 wherein processed material may enter the compaction chamber when the gate plate is in the open position; and
 wherein the exterior shape is similar to the interior of the sleeve in order to block the opening in the sleeve when municipal solid waste is compressed within the sleeve.

13. The material handling system of claim 12, further comprising: switch means for opening and closing the gate plate.

14. The material handling system of claim 13, wherein the switch means includes: a plurality of proximity switches for determining the discrete position of one or both of the rams.

15. The material handling system of claim 14, wherein the material injection assembly further comprises: a hopper supported by the sleeve and having an open bottom which communicates with an opening in the sleeve.

16. The material handling system of claim 13, wherein the gate further comprises: a pair of end plates.

17. The material handling system of claim 16, wherein: the gate plate is interpositioned between the pair of end plates and reciprocates freely therebetween.

18. The material handling system of claim 17, wherein: the end plates are configured to allow processed material to pass therethrough when the gate plate is in the open position.

19. The material handling system of claim 12, further comprising: a platform for supporting the material injection assembly in axial alignment with a horizontal axis of the hydrolyzer.

20. A material handling system for a hydrolyzer, comprising:
 a material injection assembly for sending material into the hydrolyzer comprising
  a sleeve having an interior for receiving pre-processed material; and
  a ram that reciprocates within the sleeve during use,
 a material exit assembly receiving material from the hydrolyzer comprising
  a compaction chamber for receiving processed material;
  a second ram for compacting processed material within the compaction chamber;
  a gate having a gate plate operable from between an open and a closed position;
  a processed material handling apparatus; and
  wherein processed material may enter the compaction chamber when the gate plate is in the open position.

21. The material handling apparatus of claim 20, wherein the FLUFF handling apparatus further comprises: a processed material compaction chamber; and a plunger assembly attached to the compaction chamber and further including a working cylinder having a cylinder shaft and a ram operably connected to the shaft enabling the ram to compact processed material within the compaction chamber upon actuation of the cylinder and the extension of the shaft therefrom.

22. A material handling system for a hydrolyzer, comprising:
- a material injection assembly comprising
    - a sleeve for receiving pre-processed material and including and interior shape;
    - a ram having an exterior shape similar to the interior of the sleeve in order to block the opening in the sleeve when municipal solid waste is compressed within the sleeve; and
    - a first gate having a first gate plate operable from between an open and a closed position, wherein the material may pass therethrough when the first gate plate is in the open position; and
    - the material passing through the first gate plate into the hydrolyzer;
- a material exit assembly comprising:
    - a second gate having a second gate plate operable from between an open and a closed position wherein processed material may pass therethrough from the hydrolyzer when the second gate plate is in the open position; and
- wherein the process is continuous.

23. The material handling system of claim 22, further comprising:
- a first ram that reciprocates within the sleeve during use;
- a second ram that reciprocates within a chamber of the material exit assembly; and
- switch means for opening and closing one or both of the gate plates depending upon the reciprocal position of one or both of the rams.

24. The material handling system of claim 23, wherein the switch means includes: a plurality of proximity switches for determining the discrete position of one or both of the rams.

25. The material handling system of claim 22, further comprising: a hopper supported by the sleeve and having an open bottom which communicates with an opening in the sleeve.

26. The material handling system of claim 25, further comprising: at least one tenon connected to at least on of the rams and positioned to touch the switches during reciprocation of the rams to actuate the switches and the opening or closing of one or both of the gate plates.

27. The material handling system of claim 22, further comprising: a platform for supporting the material injection assembly in axial alignment with a horizontal axis of the hydrolyzer.

28. The material handling system of claim 22, wherein at least one of the gates further comprises: a pair of end plates.

29. The material handling system of claim 28, wherein the gate plate of at least one of the gates is interpositioned between the pair of end plates and reciprocates freely therebetween.

30. The material handling system of claim 29, wherein: the end plates are configured to allow material to pass therethrough.

31. A material handling system for a hydrolyzer, comprising:
- a material injection assembly comprising
    - a sleeve for receiving pre-processed material; and
    - a first gate having a first gate plate operable from between an open and a closed position, wherein the material may pass therethrough when the first gate plate is in the open position; and
    - the material passing through the first gate plate into the hydrolyzer; and
- a material exit assembly comprising:
    - a second gate having a second gate plate operable from between an open and a closed position wherein processed material may pass therethrough from the hydrolyzer when the second gate plate is in the open position; and
    - a processed material handling apparatus; and
- wherein the process is continuous.

32. The material handling apparatus of claim 31, wherein the FLUFF handling apparatus further comprises: a processed material compaction chamber; and a plunger assembly attached to the compaction chamber and further including a working cylinder having a cylinder shaft and a ram operably connected to the shaft enabling the ram to compact processed material within the compaction chamber upon actuation of the cylinder and the extension of the shaft therefrom.

* * * * *